United States Patent [19]

Holly

[11] 4,425,648
[45] Jan. 10, 1984

[54] WAVELENGTH SELECTIVITY OF LASERS AND CONTROL THEREOF FOR RAPID ACTION MEASURING TASKS

[75] Inventor: Sandor Holly, Woodland Hills, Calif.

[73] Assignee: Rockwell International Corporation, El Segundo, Calif.

[21] Appl. No.: 220,862

[22] Filed: Dec. 29, 1980

[51] Int. Cl.³ .............................................. H01S 3/10
[52] U.S. Cl. ...................................... 372/20; 372/97; 372/93; 372/102; 356/328; 356/334
[58] Field of Search .................... 372/102, 98, 32, 97, 372/107, 108, 93, 101, 29, 33, 20, 94, 23; 356/328, 334; 330/4.3

[56] References Cited

U.S. PATENT DOCUMENTS 3,753,148  8/1973  Billman .............................. 372/102
4,093,924  6/1978  Farcy ..................................... 372/93

OTHER PUBLICATIONS

"Q Switching of the Carbon Moxoxide Laser", Osgood Jr. et al., *App. Phys. Lett.* vol. 5, No. 2, Jul. 15, 1969.

*Primary Examiner*—William L. Sikes
*Assistant Examiner*—Léon Scott, Jr.
*Attorney, Agent, or Firm*—H. Frederick Hamann; Harry B. Field

[57] ABSTRACT

A laser having an active region capable of lasings at different wavelengths includes an optical resonator cavity bounded at one end by one of several different wavelength-selective gratings. An adjustable mirror selects one of the wavelength-selective gratings by optically aligning the active region with the selected wavelength-selective grating. The position of the adjustable mirror is controlled by a combination of open loop-closed loop control. The open loop control includes a staircase generator, the closed loop control includes reference mirrors coacting with a feedback reflector in the back of the adjustable mirror for directing a control beam onto a position sensor. The length of the optical resonator cavity is dithered to retune the cavity for each wavelength selection. The beams produced at the various wavelengths are used, for example, to measure the optical energy content in a gas dynamic laser medium.

20 Claims, 6 Drawing Figures

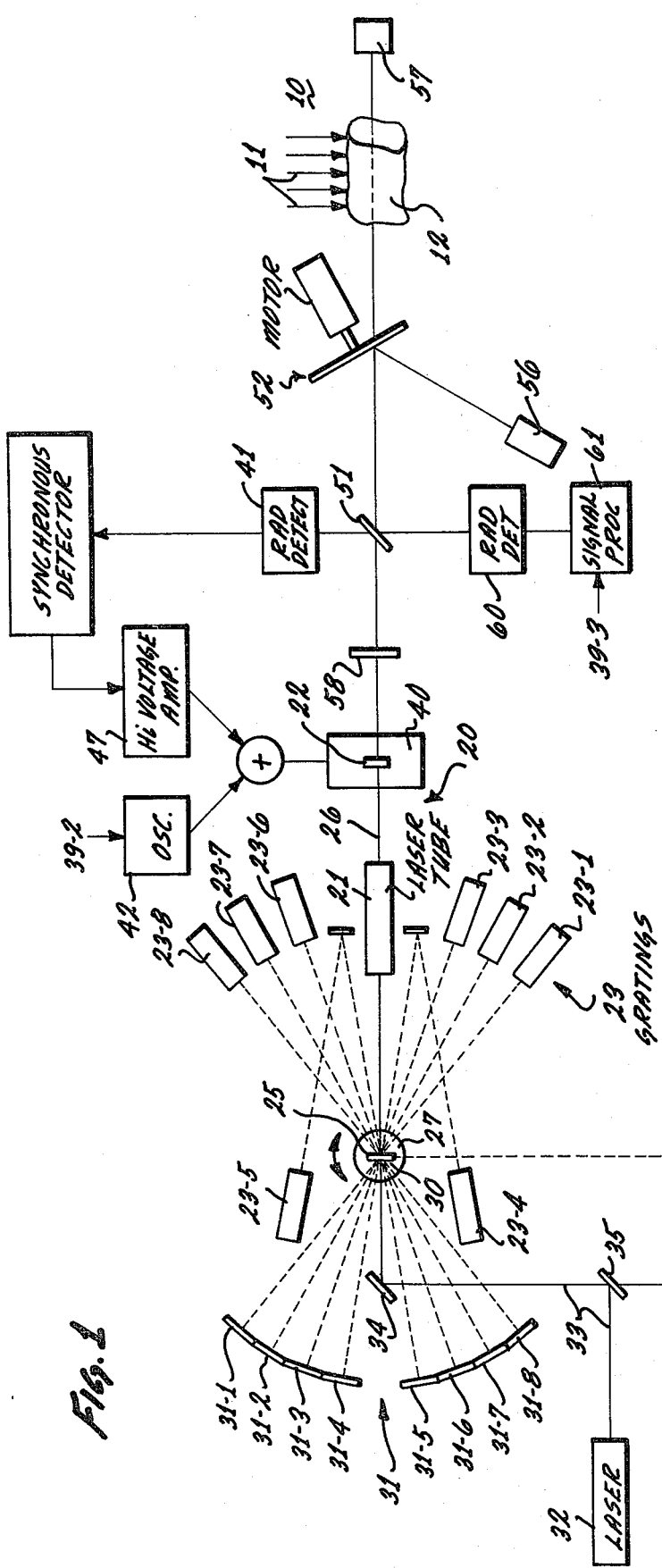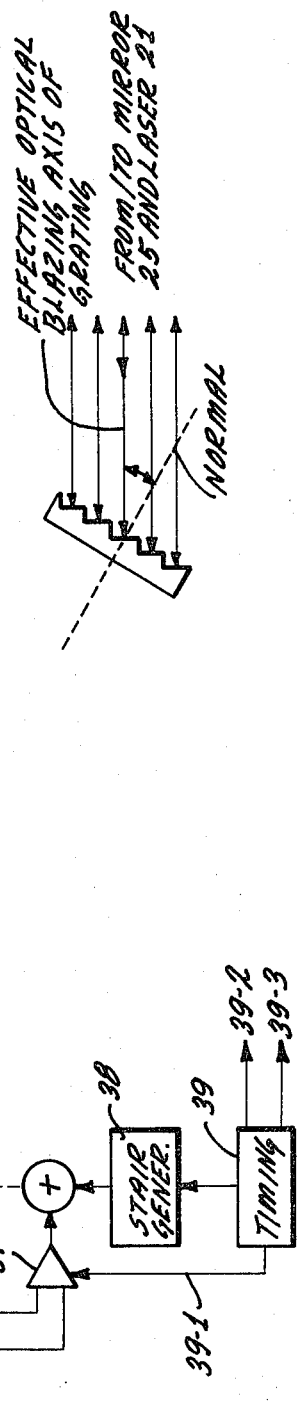
Fig. 1
Fig. 1a

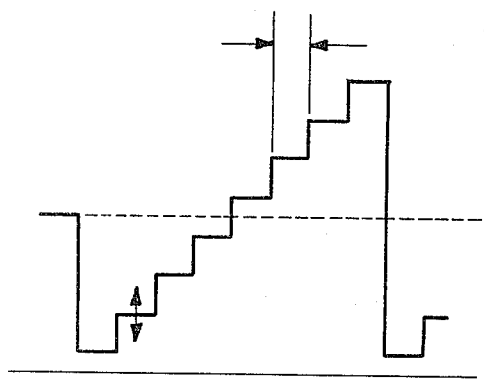
Fig.2
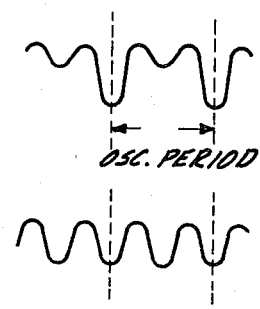
Fig.4a
Fig.4b
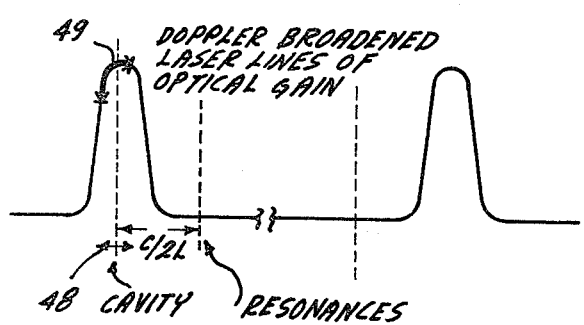
Fig.3
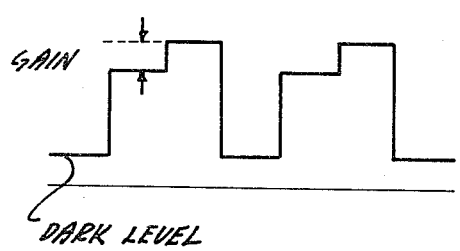
Fig.6
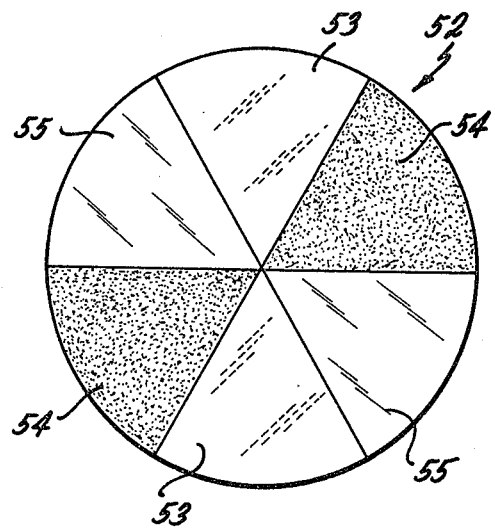
Fig.5

WAVELENGTH SELECTIVITY OF LASERS AND CONTROL THEREOF FOR RAPID ACTION MEASURING TASKS

BACKGROUND OF THE INVENTION

The present invention relates to the wavelength selectivity of lasers.

A desired characteristic of laser operation is per se based on its potential degree of wavelength selectivity. However, in many instances the laser medium such as a plasma is capable of concurrent lasing actions at different wavelengths and will, in fact, do so, so that the output is a multiple of monochromatic beams having different wavelengths. The laser is said to have and to operate at different axial modes of its resonator. This does not necessarily render the laser polychromatic as the various laser modes may be situated within the same spectral line of the optical gain medium.

There is a need in various fields of application and for various purposes to have available a source of monochromatic optical beams of particular wavelengths to be produced one at a time with rapid change-over from one wavelength to another one. One of these needs was discovered by me pursuant to a problem involing measuring the optical energy content of a gas dynamic laser by means of a low power probing laser as will be described below.

DESCRIPTION OF THE INVENTION

It is an object of the present invention to provide a new and improved construction in and for lasers which permits a rapid change in laser output wavelength. It is, therefore, an object of the present invention to provide for particular wavelength selection of plural wavelength lasers.

It is another object of the present invention to provide a new and improved reflector construction for one boundry of the optical cavity in a laser.

It is another object of the present invention to provide a sensing, measuring or probing beam which is, on one hand, highly monochromatic but whose wavelength can be changed by predetermined increments, preferably quite rapidly.

It is further an object of the present invention to provide a measuring beam whose gain or loss is a measuring parameter and whose wavelength can be changed to obtain different discrete measuring wavelengths, each with extremely narrow bandwidth.

It is a still further object of the present invention to measure optical gain or loss at distinct wavelengths in a medium and for purposes of complex measuring tasks.

In accordance with the preferred embodiment of the invention, a laser is used having a plurality of wavelength regions of possible lasings such as a gas laser having an active region in which different energy levels have an inverse population permitting lasing action at different wavelengths. The laser has a particular cavity bounded by two reflectors one of which being an output coupler. In accordance with a specific feature of the invention, one of these reflectors is selected from a reflector assembly which is composed of plural reflective wavelength-selective gratings, each grating reflecting a very narrow band of wavelengths only, practically a single wavelength; these wavelengths of these gratings are preferably adjusted to coincide with the center of the laser gain regions. Inside the optical cavity, is also an adjustable mirror that optically aligns the active region with one of the different wavelength-selective gratings.

The adjustable mirror is angular-position controlled to assume one of the several operating positions, thereby causing one of the several wavelength-selective gratings to serve as the one reflector of the optical laser cavity. The position control is preferably carried out in a combination of open loop-closed loop control configuration. As to the open loop, the adjustable mirror is driven and positioned by a motor preferably of the type used in galvanometers, having a coil which will turn or tilt the mirror by a particular angle upon receiving a particular voltage. The open loop positioning involves the application of that particular voltage so that the adjustable mirror assumes the desired position as accurately as possible in an open loop positioning operation.

As far as closed loop or precision positioning control is concerned, the adjustable mirror has preferably its rear surface provided also with a reflective finish i.e. a feedback reflection the two reflective surfaces being approximately parallel to each other. A set of reference mirrors fixed in predetermined orientations cooperates with the feedback reflector in that depending upon its position one of the fixed reference mirrors is selected thereby to reflect a control beam into itself, via the feedback reflector and onto a position sensor. The output of that sensor is indicative of the proper angular position of the galvanometer-driven adjustable mirror. Any error in angular orientation of the adjustable mirror generates an error voltage with both polarity and amplitude information which is used to correct the voltage driving the adjustable mirror coil. The open loop control voltage is, for example, changed in a staircase-like pattern to thereby change optically from one grating to another one, covering any or all of them if necessary to correspondingly change the wavelength of the laser output. In each instance close loop operation positions the adjustable mirror angularly at the needed accuracy. Each position is maintained with high precision for the duration in which the particular laser operating wavelength is needed.

As stated earlier, there is a need for measuring the optical energy content of high power gas dynamic lasers having their lasing wavelengths at different bands of the IR spectrum. Such a laser can run continuously for a short period of time only, e.g., a few seconds, so that the measurements must be undertaken at a commensurate, rapid pace. In accordance with the invention, it is suggested to use a probe laser whose laser wavelengths duplicate those of the laser to be investigated and whose optical cavity is constructed as per the invention. This probe laser can be rapidly changed as to its output wavelength. The probe beams of different wavelengths are emitted from the probe laser co-linearly in sequence, and traverse the plasma of the gas dynamic laser to be tested. The optical gain in each beam is separately measured. The various beams are produced within a few seconds or less, commensurate with the brief period in which the gas dynamic laser runs continuously.

In principle, the respective grating could also serve as an output coupler for wavelength-selective laser in that, for example, a particular order of diffraction from the grating, other than the Littrow order, can be used as laser output. Suitably placed additional mirrors will direct the particular output beam from the differently oriented grating into a common output. However, it is preferred to use the grating as back or rear reflector with maximum reflection at the wavelength of interest while the other boundry of the optical cavity is established by a conventional semi-transparent, spherically reflective output coupler.

Another task may, be measuring the absorption of different wavelengths caused by different contaminates in a gas, e.g. air. Different wavelengths are needed to permit sorting and separating the different cases for absorption because different materials may absorb wavelengths that are approximately the same, but the different substances absorb different combinations of wavelengths. As the gas (air) may be continuous flowing, rapid change from one wavelength to another is needed to obtain results, which can be correlated to each other as the conditions should not significantly change in between the different readings.

DESCRIPTION OF THE DRAWINGS

While the specification concludes with claims particularly pointing out and distinctly claiming the subject matter which is regarded as the invention, it is believed that the invention, the objects, features and advantages thereof will be better understood from the following description taken in connection with the accompanying drawings in which:

FIG. 1 is a somewhat schematic system diagram for measuring the optical energy content of a gas dynamic laser that is available for lasing and which includes the preferred embodiment of the invention;

FIG. 1a illustrates schematically a grating used in the system of FIG. 1;

FIG. 2 is a schematic illustration of a typical staircase ramp wave form that is used to drive the "adjustable" mirror as shown in FIG. 1;

FIG. 3 is a diagram showing two adjacent doppler broadened laser lines;

FIGS. 4, 4a are further diagrams of waveforms of optical gain in a $CO_2$ laser for explaining the dither control of cavity length;

FIG. 5 is a front view of a multiplexing chopper used in the system of FIG. 1; and FIG. 6 is another waveform diagram, showing the characteristics of a detector signal, that is time multiplexed.

Proceding now to the detailed description of the drawings, FIG. 1 illustrates an optical gain medium which is generated by a set of nozzles 11 discharging gases at a particular temperature and pressure drop such that a population inversion occurs, causing various molecules of the resulting plasma or test medium 12 to be in metastable states so that the plasma becomes a laser active medium. By way of example, the laser substance may be a mixture of $CO_2$-$N_2$ wherein the $CO_2$ molecules have temporarily a large population in higher energy states. The transition from the higher states to lower states produces a medium in which optical energy is available for lasing and is created at discrete wavelengths. These laser wavelengths may be referred to as pertaining to the different J rotational line transitions. One object of the invention is to measure the optical energy available in the flow field of the GDL by separately measuring the optical gain for each of the several wavelengths involved. This measurement is to be carried out in the absence of a laser action, i.e., the test medium or plasma 12 is not bounded by two reflectors for establishing an intra-cavity self-sustained electromagnetic field during the measurement.

The requisite measurement is carried out on the basis of detecting the optical gain or loss, which a probe beam experiences while traversing the test medium 12. This probe beam is produced by a probe laser 20 and is processed and further evaluated in conjunction with the measuring section of the system.

The probe laser 20 includes a $CO_2$ plasma tube 21, and the active region therein is energized to obtain different J-line transitions, though the mode of energization may be a different one. As far as the laser medium of this probe laser and its energization by way of electrical discharge is concerned, 21 is a conventional laser plasma tube.

From a general point of view and independent from the particular purpose of laser 20, this active region for this probe laser may be generated by gases, liquids (dye laser) or solids by using any of the accepted pumping (excitation) methods. The only requirement is that the laser transitions of the gain medium will provide the wavelengths which meet the required purpose. In the application as described above, at least some of the wavelengths transitions of laser 20 must be identical with the characteristic wavelengths of laser 10.

The optical laser cavity for this laser 20 is established at one end by a semi-transparent/semi-reflective, concave primary reflector 22 which is the output coupler of this laser (stable optical resonator configuration). The primary reflector 22 is gimbal mounted on a piezoelectric device 40 which is designed to permit adjustment of the angular position and linear translation in two orthogonal axes of primary reflector 22 and along the optical axis 26 of this laser. From an analytical point of view, it is convenient to say that the primary reflector 22 and the bore of the plasma tube 21 establish the optical axis of the laser 20. The ends of tube 21 are provided with Brewster windows, which is also conventional.

The other end of the laser cavity is selectively terminated by any one of the eight wavelength-selective gratings 23-1 through 23-8. These wavelength-selective gratings 23 are all of identical construction and are characterized by the fact that they reflect only one particular wavelength onto itself, i.e. back into the optical axis of the respective grating. Other wavelengths are deflected or scattered away from the bore of the plasma tube. The bandwidth of reflection of each wavelength-selective grating is narrow enough to allow lasing at only one wavelength at a time.

FIG. 1a illustrates such a wavelength-selective grating by way of example. The wavelength-selective grating is in the Littrow reflection mode for one particular wavelength which, according to this illustration, also matches the blaze angle. It can be adjusted (tuned) by micrometer rotation about an axis perpendicular to the plane of the drawing. The wavelength-selective grating is basically oriented to return one particular diffraction beam and at a blazing angle. In different tilting positions, different wavelengths are so returned. In either case, the bandwidth of the returned beam is narrow. Other wavelengths in the incoming beam are diffracted in different directions.

The several gratings each are adjusted (tuned) to different wavelengths. Particularly, these eight wavelength-selective gratings 23 are adjusted to respectively reflect eight different J-line transition wavelengths that are generated by a $CO_2$ active region of tube 21, which are in the 10 $\mu$IR band. The wavelength-selective gratings are arranged so that their optical axes intersect in a common center. This is true for wavelength-selective gratings 23-4 and -5 only if one considers that two auxiliary mirrors 24-4 and 24-5 fold the effective optical axes of these two gratings. Wavelength-selective gratings 23-4 and -5 are simply folded back optically in the offset position for reasons of lack of space. An adjustable mirror 25 is disposed in the intersection of these axes with the optical axis 26 of laser 20.

Depending upon its position, adjustable mirror 25 can align the optical axis 26 of the laser with the optical axis of any of the gratings, so that conversely each of the gratings 23 can be optically aligned with the active region. Thus, depending upon the disposition and pivot angle of adjustable mirror 25, lasing action of laser 20 is permitted at only one wavelength. Other J-line transitions do not participate in the action. The selection of any one of the pretuned wavelengths is carried out by appropriately positioning switch mirror 25.

Adjustable mirror 25 is mounted on a galvanometer type motor 27, which is spring biased and having an energizing coil. This motor tends to deflect the adjustable 25 by an angle given by the voltage applied to the motor-galvanometer coil. The voltage for adjusting the angular position of adjustable mirror 25 can be deemed composed of two components, an open loop component and a closed loop component. The open loop component originates in an electrical dive or a generator 38, which provides in each instance a particular voltage.

In the general sense, and as far as adjustable mirror 25 and adjustable means or galvo-motor 27 is concerned, its drive voltage can be of any suitable value and could be changed at will or in accordance with an arbitrarily selected program. Presently, it is assumed that the generator 38 is a staircase generator, being triggered by a timing unit 39 which issues pulses, e.g. in 200 msec. invervals so that the generator 38 produces eight different voltages, each for a period of 200 msec., and after 1.6 seconds the cycle is repeated. (See FIG. 2). Each of the new voltage values produces a new angular position of adjustable mirror 25 to align the next of the eight gratings with the optical axis 26 of probe laser 20. The respective positions will be approximately correct, but there may be some misalignment. Therefore, the correct position in each instance is provided by closed loop control as follows.

The back of adjustable mirror 25 is likewise a reflective surface being denoted by feedback reflector 30; these two reflective surfaces 25 and 30 are approximately parallel to each other. Eight auxiliary reference mirrors 31-1 through 31-8 are arranged on a circle segment, and the normal to the reference mirrors 31-1 to 31-8 intersect in a common point on feedback reflector 30. The reference mirrors 31 are positioned at right angles to feedback reflector 30 when having a position so that adjustable mirror 25 aligns one of the gratings precisely with the laser axis 26.

An auxiliary laser 32, e.g. a small HeNe laser provides a narrow pencil beam (actually, any source that can provide a narrow pencil beam could be used, a HeNe laser is simply the most practical one). A pair of reflectors 34, 35 injects the HeNe auxiliary beam 33 of laser 32 onto the back of the adjustable mirror 25.

It will be appreciated that a position in which adjustable mirror 25 is precisely at right angles to axis 26, is not an operating position, because in that case the optical cavity of laser 20 is actually bounded at that end by adjustable mirror 25. Adjustable mirror 25 will function as rear mirror for the laser 20, which will result in all line lasing of the probe laser 20 and has mainly diagnostic significance for the present case. Analogously, the beam 33 will be returned by mirror 30 directly thru beam splitter 35, to position sensor 36 constituting an additional stable, zero state for the closed loop operation to be described below.

As stated, the reference mirrors 31-1 to 31-8 are position reference mirrors as they are positioned to respectively correspond to the position of wavelength-selective gratings 23-1 to 23-8. In other words, for a particular angular orientation of adjustable mirror 25, the beam of laser 20 uses wavelength-selective grating 23-1 (or 23-3, or 23-3, etc.) as cavity boundary. In the same position, the feedback reflector 30 directs the beam 33 of the laser 32 into the axis of reference mirror 31-1 (or 31-2 or 32-3, etc.) so that the beam is returned into itself, and after partial transmission through beam splitter 35 reaches a position sensor 36.

This position sensor 36 is disposed to produce a zero (electrical) output if the position of feedback reflector 30 (and, therefor, of adjustable mirror 25) is a correct one as defined as far as alignment selection of one of the wavelength-selective gratings 23 and one reference mirrors 31 is concerned. Non zero output is indicative of an off center or off axis path of the returned beam 33. This output is amplified in an amplifier 37 and is superimposed in a summing point upon the output of staircase generator 38 as supplemental control signal. In effect, the non zero output of the position sensor proportionately shifts the currently effective "step" height of the staircase generator 38 up or down, as indicated schematically by the bidirectional arrow in FIG. 2.

As stated, the generator 38 furnishes the control voltage to obtain a particular angular orientation of the galvo-motor 27. The feedback loop for the position of feedback reflector 30 in back of adjustable mirror 25 provides for supplemental, tight servo-control and position correction if the staircase signal fails to tilt the adjustable mirror 25 into the desired position, as defined by a central position on the position sensor of returned beam 33.

It should be mentioned that a galvanometer mirror generally could be position controlled by a conventional sensor system that senses the angle of the mirror shaft. However, this type of device permits an accuracy of at the most about one milliradian which is not precise enough for the present application. The outer, optical servo loop as described, achieves at least two orders of magnitude tighter angular positioning accuracy which satisfies the requirement for reliable lasing of probe laser 20.

It should be noted that the generator 38 provides the different voltage levels in a particular order to run through the frequency selectivity as provided by the wavelength-selective gratings 23 in a particular sequence. This sequence may be repeated if desired. In the general case, generator 38 could be a programmable or even manually selectable voltage signal generator, providing any desired position control voltage for angularly reposition the shaft of motor 27. In each instance the feedback control will stabilize the position of the adjustable mirror 25 to be maintained in one of the eight different positions. Also, each angular position could be maintained for as long as desired. However, the inventive system is particularly designed to obtain a rather rapid change in the selection of different wavelength-selective gratings 23.

The timing unit 39 should be constructed further to issue a particular signal (line 39-1) that begins when the trigger signal is applied to generator 38. Thus, the leading edge of this additional signal coincides with the beginning of the signal level jump in the staircase output. This additional signal is applied as gating signal to the amplifier 37, e.g. forcing its output to zero for a particular period of time. That period of time is selected to cover the time it takes motor 27 to move the adjustable mirror 25 and feedback reflector 30 from one angular position to another one, pursuant to a change in output of generator 38 as applied to the summing point. Thus, the signal line 39-1 serves as blanking signal and interrupts the loop for the transition period. After the adjustable mirror 25, and feedback reflector 30 has assumed the new position, the blanking signal is discontinued allowing closing of the control loop. The servo control will take over thereafter to fine-position-adjust the adjustable mirror 25, feedback reflector 30. The blanking period may be in the order of a couple of milliseconds.

It will be appreciated that the spectral lines (e.g. the J-line) used in the laser 20 may be sufficiently broad to include multiple laser cavity modes, which modes are separated by a value in terms of frequency given by $C/2L$ wherein C is the speed of light and L is the effective length of the optical cavity. However, in the case of $CO_2$ gain media, where the line widths are typically in the order of 50 Mc, while cavity resonances are (for a 1 meter long optical resonator) in the order of 150 Mc, not more than one cavity resonance may be aligned at any time with the 50 Mc wide gain profile. There are, in fact, regions of the cavity length for which cavity resonance is not coincident with the spectral line which is selected by the grating and, therefore, lasing is not possible. It is, therefore, necessary to retune the laser cavity by adjusting its length after each adjustment stop of the adjustable mirror 25, and feedback reflector 30.

FIG. 3 depicts by way of example a couple of doppler broadened laser lines of optical gain, one of which may be selected when grating 23-n (n=1, 2, 3 . . . ) is optically coupled to laser 20. The laser has, of course, other gain modes as illustrated, and they all are part of the line spectrum of the lasing material, e.g. $CO_2$. The figure shows also several cavity mode lines and one is located approximately near the center peak of the gain curve of mode #1.

A coarse tuning which allows choice of one of these lines for each wavelength-selective grating has been accomplished by appropriately positioning the several wavelength-selective gratings 23. In other words, the optical path lengths in the laser cavity differ for each of the gratings. The optical arm of each grating is initially adjusted by precision translating the grating along the optical axis. This way, the optical cavity length is adjusted to place a cavity mode at least approximately into the respective gain band to which the grating has been tuned and near the center peak of that gain profile as close as feasible by such mechanical adjusting procedure.

In order to fine tune the laser cavity, an oscillating voltage is applied by a lock-in type control circuit to the piezoelectric positioner 40. The control circuit as illustrated is an example only and does not constitute per se a feature of the invention. The sinusoidal voltage is taken from a regular RF oscillator 42 and is effective in changing the cavity length in a cyclic fashion to shift the cavity mode lines back and forth over a limited frequence range. A small portion of the output beam of laser 20 is split off by a semitransparent mirror 51, and a detector 41 responds to that portion of the beam. The output as detected has a d.c. component and a variable a.c. component. The variable component includes primarily two frequencies, one being equal to the oscillator frequency, the other being twice that value.

FIG. 3 explains the production of the a.c. component of the detector output such as depicted in FIG. 4a. As the oscillator 42 moves the primary reflector 22 along the optical axis, the cavity mode lines move back and forth as indicated by the bidirectional arrow 48. The zero position of the cavity resonance is assumed not to coincide with the peak of the laser mode. Therefor, the effective gain values (due to the oscillatory shift in cavity length) follow arrow 49 and its wave form is asymmetrical; shifts to the left cover lower gain values than shifts to the right. Thus, the detector output has a variable component at twice the oscillation frequency but every other down excursion is deeper (lower level) than the down excursion in between. Consequently, the detector signal has a component equal to the oscillation frequency. If, for example, the cavity mode were centered still more to the left, the detector output would have an oscillating component having predominantly that frequency. When the cavity resonance centers on the gain profile, the fundamental frequency component in the detector signal goes to zero and the a.c. component of the detector signal will contain only second and higher harmonics, which are not sensed and amplified electronically (FIG. 4b).

A narrow filter, such as available by using synchronous detection as shown in FIG. 1, permits only a component in the detected signal to pass having that oscillation frequency. This output is detected and converted into a d.c. signal in stage. A phase detector detects the phase of this oscillating component by comparing it with the output of oscillator 42, to determine whether the zero point for the resulting oscillation of the cavity mode is located to the right or to the left of the gain peak. Thus, the synchronous detector determines whether the optical cavity has to be lengthened or shortened by an amount proportional to the amplitude of the fundamental frequency in the detector signal.

As a consequence of the foregoing detection, a d.c. signal is applied to an integrating amplifier 47 with the required polarity. The integrated output is superimposed upon the oscillation output as a d.c. signal for shifting the piezoelectric carrier 40 of primary reflector 22 in one or the other direction until the cavity line coincides with the gain peak. As soon as that is the case, the cavity mode will oscillate about the gain mode peak. Consequently, the fundamental component of the a.c. signal of the detector goes to zero, only second and higher harmonic components remain in the signal. The contour of the detector signal now produced is shown in FIG. 4b. This fact, in turn, is indicative of the fact that the cavity mode line is now sufficiently centered. The vibrations may be stopped and the loop will be turned off, but integrator 47 holds the offset value to retain the piezoelectric translator 40 in the adjusted position. Since this cavity mode adjusting operation can be expected to be completed in a specified period of time, the timing unit 39 (signal line 39-2) will terminate this adjusting operation by turning the oscillator 42 off. Primary reflector 22 on piezoelectric translator 40 remains in the adjusted position establishing the requisite cavity length.

It will be appreciated that the cavity mode adjustment must not commence until the respective wavelength-selective grating has been accurately aligned with the laser axis. Thus, a particular period after a step has been commanded by controller 39 to generator 38, an enabling signal (line 39-2) is applied to the circuit for dithering the carrier 40 and at the end of that period dithering ceases, and the integrating amplifier holds the carrier in the adjusted position. The signal in line 39-2 turns the oscillator 42 on for a period sufficient to complete the cavity mode servo tuning.

After having described the production of a measuring beam by laser 20 having one of eight possible different frequencies on account of the frequency selectivity of the rear reflectors of laser, wavelength-selective gratings 23, I proceed to the description of the measurement that can be undertaken with any such beam. The beam leaves the laser 20 through the primary reflector 22 and passes the semi-transparent mirror 51 which passes most of the beam; the remainder was used for the dither control, and also for output beam intensity monitoring. The passing beam continues towards the cavity 10 but is intercepted by a chopper 52 driven by a motor and rotating on an axis which is obliquely oriented to the beam.

The chopper 52 has six segments (see FIG. 5) of which respective two are similar, i.e. there are two sets of three segments, each covering an angular range of 60°. This is not essential in principle but it is convenient to use similarly wide segments. A first pair of segments 53 is transparent; a second pair, 54, is absorbing; and a third pair 55 is reflective. Thus, the probing beam is sequentially transmitted, reflected, absorbed, transmitted, etc., at double the rate of rotation of the chopper motor.

As far as reflection of the beam by the segments 54 is concerned, a corner cube 56 is disposed on the optical axis as folded by the reflector segments to return the beam into itself. In the case a transparent segment moves into position, it allows the probe beam to propagate through the GDL test medium 12, and is returned into itself by a corner cube 57 of like configuration.

Any return beam is partially reflected by mirror 51 onto a detector 60. Thus, the detector 60 receives either a portion of the beam as returned by cube 56, or a portion of the beam as returned by cube 57 or the detector—in the third segment of the cycle—sees background "noise". It can readily be seen that any difference between the two returned components is attributable to any gain or loss which the measuring beam experienced upon passing through the GDL test medium 12. The optical gains measured this way are characteristically different for the different wavelengths which the probe laser 20 is tuned to and are directly representative of the optical energy present in the flow field of the test medium 12. On the other hand, if the test medium 12 through which the beam passes does not possess optical energy, or if the probe laser wavelength is not one of the gain lines of the test medium 12, or if the medium is just any gas, the beam returned by cube 57 will be either unaltered or will be attenuated by the passage and the detection will find its intensity to be equal or below the intensity of the reference component reflected from corner cube 56.

Reference numeral 58 refers to a quarter wave plate. It is used as an optical isolator to protect the probe laser from its own beam reflected back from corner cubes 56 and 57 as follows. The laser beam leaving the Brewster window of plasma tube 21 adjacent to primary reflector 22 is linearly polarized by that window. After passing the quarter wave plate 58, the beam becomes circularly polarized. As it returns, the component not deflected by mirror 51 towards detector 60 continues, passes polarizer 58 and leaves it linearly polarized but in a direction orthogonal to the outgoing beam. Thus, the return beam component will not re-enter the laser 20 through the Brewster window thereof. This is important, as that particular beam, if not so impeded, could continue to be bounced back by the grating, return, and re-enter test medium 12, be returned by cube 57, etc., causing probe laser instabilities. The quarter wave plate 58 in conjunction with the Brewster window avoids this problem.

In operation, the entire equipment functions as follows. After the various components have been properly positioned, the timing unit 39 is turned on, and the generator 38 produces the first step, e.g. by jumping from zero (in which the adjustable mirror 25 is centered on the axis 26) to a first value for the farthest deflection of adjustable mirror 25 on one side, to optically align wavelength-selective grating 23-1 with the laser 20. The feedback loop for the adjustable mirror 25, and feedback reflector 30 is temporarily interrupted electrically to cover the period it takes the adjustable mirror 25 to move into the new position, which takes a few milliseconds or less. As soon as the control loop is enabled (signal in line 39-1) the servo control takes over and shifts the control voltage for the motor 27 until the position sensor 35 detects satisfactory centering of the return beam 33 which is indicative of the fact that the particular wavelength-selective grating 23 is aligned with acceptable accuracy with the optical axis of laser 20.

Next, the master controller 39 applies the enabling signal (line 39-2) to the dither control for the carrier 40 to translate the primary reflector 22 along the optical axis into a position in which a cavity mode coincides with the peak of the laser gain curve at the frequency as selected by the then effective grating.

Stable conditions have been established in this manner within about 100 msec. or less and the adjustment and preparation phase is terminated in that oscillator 42 is turned off or blocked. Now, the measuring phase begins in that (for example, a timing signal in line 39-3 turns on the detector 60 or the output circuit 61). During this phase which may last about 100 msec., the chopper 52 performs several revolutions, and a time multiplexed signal train as shown in FIG. 5 is produced yielding several signal levels corresponding to the placement of different portions of the segment wheel in the optical path from laser 20. The lowest level simply indicates the background radiation which reaches detector 60. The middle level is, for example, the result of reflection by segments 55, and the highest level represents the beam as it experiences gain by a roundtrip passage through test medium 12. The true gain is the difference between highest and lowest signal level divided by the difference between the middle level as reference and the lowest level. The signal processing stage 61 may do this arithmetic function in real time in addition to the signal decommutation. Conceivably, the signal processor 61 provides an average for as many measuring cycles as are produced until the timing unit 39 triggers the generator 38 for the next wavelength step. After positioning of the grating and of the output coupler have been completed, the next measuring phase begins. Each measuring phase may typically last about 100 msec. Each adjusting phase and the following measuring phase may typically last about 200 msec., and thereafter, the position of mirror 25 is changed. After about 1.6 sec., measuring phases for all eight frequencies have been established and used and the measurement is completed. As stated, the laser 10 may be turned on for but a few seconds so that the desired measurement can, in fact, be completed within that operating period.

The invention is not limited to the embodiments described above but all changes and modifications thereof not constituting departures from the spirit and scope of the invention are intended to be included.

I claim:

1. A frequency-selective laser system, comprising:
   an optical laser cavity;
   a primary reflector serving as a first boundary of said optical laser cavity;
   a plurality of wavelength-selective gratings, each one tuned for reflecting radiation of a single wavelength and wherein each grating also serves as a boundary for said optical laser cavity;
   means for extracting radiation wherein said means comprises said primary reflector or said wavelength-selective gratings;
   an active region containing an active medium capable of lasing at more than one wavelength, being positioned between said primary reflector and said wavelength-selective gratings;
   an adjustable mirror being positioned between said active region and said gratings, to provide an optical path for each of said wavelength-selective gratings; and
   adjusting means for pivoting said adjustable mirror wherein, in recited sequence, said primary reflector, said active region, said adjustable mirror, and each of said wavelength-selective gratings in turn, are in optical alignment.

2. A laser, having a resonant, optical laser cavity defined by a wavelength-selective boundary, comprising:
   an active region containing an active medium capable of lasing at more than one wavelength;
   a primary reflector disposed so as to form a second boundary of said laser cavity;
   an adjustable mirror disposed so as to receive radiation from said active region;
   a plurality of different wavelength-selective gratings disposed to receive the reflection from said adjustable mirror and disposed to form said wavelength-selective boundary of said laser cavity; and
   adjusting means for maintaining adjustable mirror in optical alignment with said primary reflector, said active region, and one of said wavelength-selective gratings.

3. The laser of claims 1 or 2 wherein said adjusting means comprises:
   an electric drive for pivoting said adjustable mirror into more than one position, wherein each mirror position corresponds to a wavelength-selective grating; and
   circuit means for providing electrical signals to said electric drive, establishing a timed sequence of pivoting of said adjustable mirror.

4. The laser of claim 3 wherein said circuit means is a staircase generator, the particular signals being of a staircase contour and operating to stepwise position the mirror in the angular position for stepwise changing frequency selectivity of the laser.

5. The laser of claim 3 wherein said circuit means includes a feedback device operatively connected to said adjustable mirror wherein said feedback device serves as a position refinement means for stabilizing the position of the adjustable mirror in relation to said wavelength-selective gratings.

6. The laser of claims 1 or 2 further including an adjustable mirror feedback system comprising:
   a plurality of reference mirrors for insuring adaptable mirror and wavelength-selective grating alignment;
   a feedback reflector coupled to said adjustable mirror;
   optical means for directing a beam of radiation onto said feedback reflector wherein said optical means, said feedback reflector, and one of the plurality of said reference mirrors are in optical alignment, and wherein the optical alignment of each of said reference mirrors corresponds to the alignment of one of said wavelength-selective gratings;
   detection means disposed for detecting any misalignment of said optical means, said feedback reflector, and each of said reference mirrors and to provide an electrical signal representative thereof; and
   said adjusting means further including electrical drive means for said adjustable mirror connected so as to be responsive to said electrical signal.

7. The laser of claim 6 wherein said electrical signal is a staircase signal for sequentially obtaining the alignment corresponding to each of said reference mirrors.

8. The laser of claim 6, including means for temporarily suppressing said electrical signal upon changing said electrical drive means so that feedback control for stabilizing the position of the adjustable mirror is interrupted while the adjustable mirror is adjusted to a position different from a previous position.

9. The laser of claims 1 or 2 further including control means for precision-tuning the optical cavity, as defined by said first reflector and individual wavelength-selective gratings, following each adjustment of said adjustable mirror.

10. The laser of claim 1 wherein said control means includes means for dithering said primary reflector.

11. Apparatus for measuring the optical gain or loss of a beam of radiation at different wavelengths, comprising:
    a laser having a primary reflector, an active laser region and a plurality of wavelength-selective gratings, said primary reflector and said wavelength-selective gratings defining an optical resonant cavity, wherein either said primary reflector or one of said wavelength-selective gratings serve as an output coupler for extracting radiation, and directing said radiation toward a test medium;
    detector means for measuring any gain or loss of beam energy after having passed through said test medium; and
    means for changing the position of said adjustable mirror in order to obtain different wavelengths for the beam.

12. Apparatus of claim 11, wherein said adjusting means comprises an electric drive for pivoting said adjustable mirror into more than one position corresponding each of said wavelength-selective gratings, and circuit means for providing electrical signals to said electric drive.

13. Apparatus as in claim 11 wherein said circuit means includes a feedback device operatively connected to said adjustable mirror wherein said feedback device serves as a position refinement means for stabilizing the position of the adjustable mirror in relation to said gratings.

14. Apparatus as in claim 11 further including control means for precision-tuning the optical cavity, as defined by said first reflector and individual wavelength-selective gratings, following each adjustment of said adjustable mirror.

15. Method of measuring the optical energy gain or loss in a test medium at different wavelengths, comprising the steps of:

positioning a laser so that its output beam traverses said test medium, and wherein said laser further comprises an optical cavity and an active region lasing at a plurality of wavelengths, the cavity being bounded at one end by one of a plurality of wavelength-selective gratings, there being an adjustable mirror for sequentially selecting each of said wavelength-selective gratings, and at the other end by a primary reflector and wherein said output beam of said laser provides a beam comprised of a series of wavelengths substantially similar to the different wavelengths of the test medium; and comparing beam energy after having traversed said test medium with beam energy prior to traversing said test medium.

16. Method as in claim 15 wherein comparing beam energy includes the step of permitting said beam to pass through said test medium and alternatingly inhibiting such passage for detecting reference values between each detecting of the beam as having passed through the test medium.

17. Method as in claim 15 wherein said pivoting step includes a stepwise change of said adjustable mirror to sequentially couple one of said wavelength-selective gratings after the other to said active region.

18. Method as in claim 17 including the step of adjusting the length of the optical cavity after each change in said adjustable mirror position.

19. Method as in claims 15 or 18, said test medium being a plasma of a gas dynamic laser also having said wavelengths.

20. Method as in claim 17 including the step of attuning said pivoting step by providing a feedback signal to more precisely position said adjustable mirror.

* * * * *